UNITED STATES PATENT OFFICE.

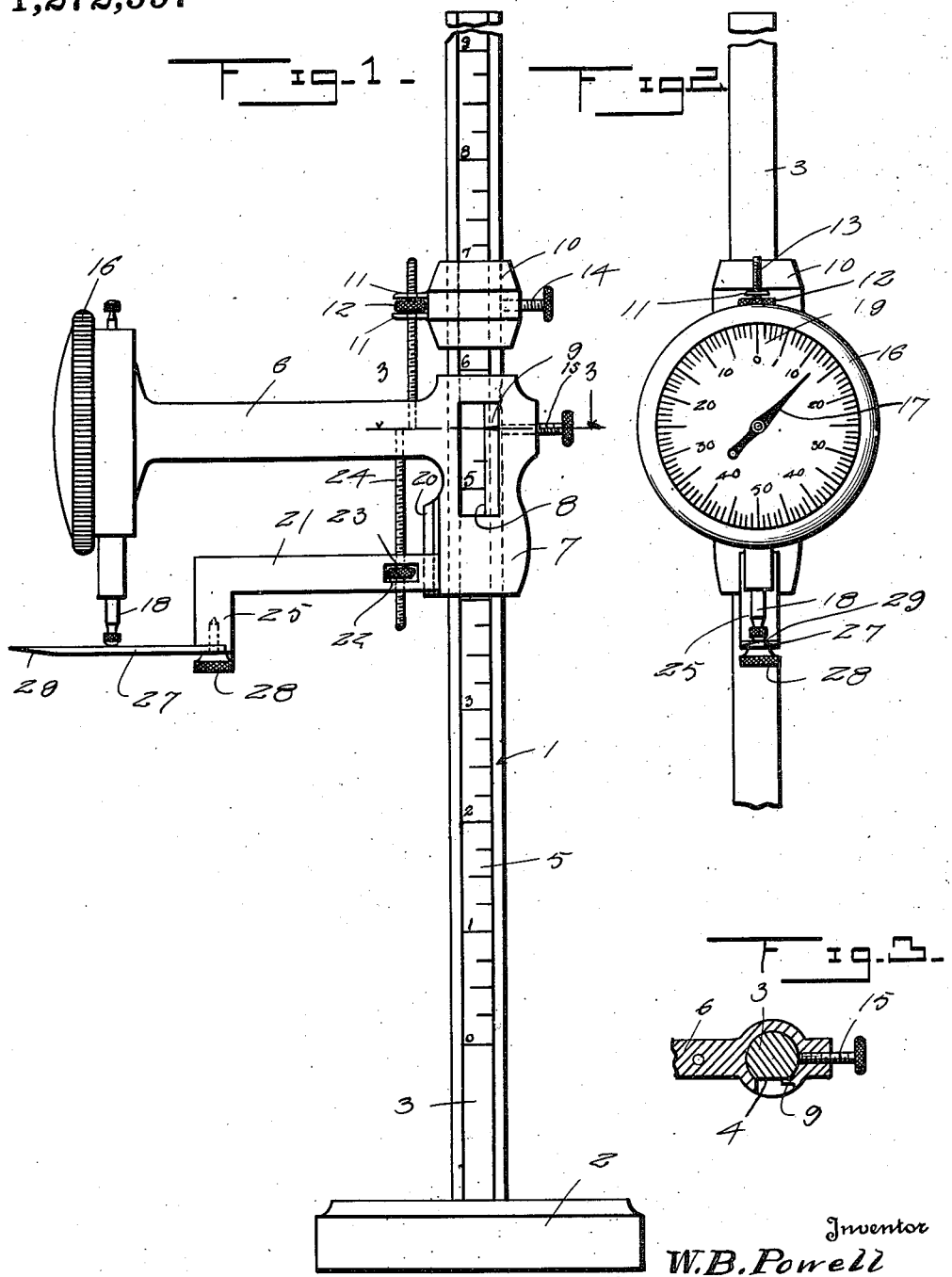

WALTER B. POWELL, OF WASHINGTON, DISTRICT OF COLUMBIA.

COMBINED MICROMETER HEIGHT-GAGE AND INDICATOR.

1,272,997.      Specification of Letters Patent.    Patented July 16, 1918.

Application filed January 25, 1918. Serial No. 213,777.

*To all whom it may concern:*

Be it known that I, WALTER B. POWELL, a citizen of the United States, residing at Washington, in the District of Columbia, have invented certain new and useful Improvements in Combined Micrometer Height-Gages and Indicators; and I do hereby declare the following to be a full, clear, and exact description of the invention, such as will enable others skilled in the art to which it appertains to make and use the same.

This invention relates to height gages and the primary object of the invention is the provision of an improved height gage especially adapted for accurate work in which the usual vernier scale is dispensed with and a dial indicator substituted therefor, which will give the accurate reading of the gage to the thousandth of an inch and thus eliminate the usual inconvenience associated with reading the ordinary vernier scale.

Another object of the invention is the provision of an improved micrometer height gage and indicator having a sliding arm which carries an adjustable scriber, the arm being mounted on a graduated standard, the scriber being so arranged as to engage the plunger of an indicating dial, which has its face graduated to indicate thousandths of an inch so that upon adjusting the scriber, the plunger of the dial will be operated and thus rotate the pointer and giving the reading to a thousandth of an inch.

A further object of the invention is the provision of a micrometer height gage and indicator in which the position of the scriber can be reversed so that the same can be used for measuring recesses, grooves and the like.

A still further object of the invention is to provide a device of the above character, which is durable and efficient in use, one that is simple and easy to construct, and one that can be placed upon the market at a reasonable cost.

With these and other objects in view, the invention consists in the novel construction, arrangement and formation of parts, as will be hereinafter more specifically described, claimed and illustrated in the accompanying drawing forming a part thereof, in which:—

Figure 1 is a side elevation of my improved height gage.

Fig. 2 is a fragmentary front elevation of my improved height gage showing the dial indicator, and Fig. 3 is a detail transverse section taken on the line 3—3 of Fig. 1.

Referring to the drawing in detail, wherein similar reference numerals designate corresponding parts throughout the several views, the numeral 1 generally indicates the improved device, which includes the base 2, which supports a vertical standard or measuring bar 3. The standard 3 has a flattened side 4 having a scale 5 thereon. Slidably associated with the standard 3 is the outwardly extending arm 6 which has its inner end enlarged and provided with a member 7 which is formed relatively long and extends below the arm 6. The member 7 is provided with a vertical aperture slidably receiving the standard 3 and the fit between these two members is such that lost motion is precluded. The member 7 is formed relatively long as stated above for engaging the standard to prevent swagging or twisting of the arm 6 with relation to the standard. The member 7 is also provided with a vertically extending recess 8 communicating with the recess receiving the graduated standard, through which the graduations of the standard can be readily seen and an index pointer 9 is formed on the member so as to register with the scale.

Slidably mounted on the standard 3 above the member 7 is a collar 10 having a pair of spaced outwardly extending ears 11 between which is positioned the adjusting nut 12 which is turned on the screw 13, which extends through the ears 11 and has its lower end rigidly secured to the arm 6. The outer surface of the nut is knurled so that a finger grip can be readily obtained on the same. A set screw 14 is carried by the collar 10 for engaging the standard 3 to lock the collar thereto. Thus the arm 6 is moved to the approximate height of the article being measured and the set screw of the collar turned so as to lock the same on the standard and the nut 12 is then rotated until the finer adjustment of the arm 6 is obtained. A set screw 15 is carried by the member 7 for engaging the standard for locking the member 7 thereto after the accurate adjustment of the arm has been obtained.

The outer end of the arm 6 carries a dial indicator 16, which is of the ordinary or any preferred construction and has the pointer 17 which is operated by a spring pressed plunger 18. The connection between the pointer and plunger does not form a portion of this application and any suitable or preferred means can be employed, such as a rack and a pinion. The face of the dial is graduated to indicate fractions of an inch as at 19. The scale 19 is numbered from the center in both directions from zero to fifty, thus giving a plus and minus reading from the zero point.

The member 7 is provided with a vertically extending rib 20 on one face thereof directly below the arm 6 and slidably mounted on the rib 20 is an outwardly extending measuring arm 21 which extends in the same direction as the arm 6 and the same has its inner end provided with a groove to slidably receive the rib. The measuring arm 21 is provided with a pocket 22 in which is fitted the knurled adjusting nut 23 which is turned upon a screw 24, which extends through the measuring arm 21 and has its upper end rigidly secured to the arm 6 and upon movement of the nut 23 the measuring arm will be slid upon the rib. The outer end of the measuring arm is bent downwardly at right angles as at 25 and has its free end recessed as at 26 to receive the inner end of the scriber 27. The scriber is provided with an opening which registers with a threaded recess in the outer end of the arm and a set screw 28 is fitted in the recess and holds the scriber in position. The scriber extends outwardly from the measuring arm and the plunger 18 of the dial indicator rests on the same and movement of the scriber is indicated by the dial indicator to a thousandth of an inch. The under surface of the scriber at the outer end thereof is beveled as at 29 so as to take a fine reading and the same can be turned over and used for measuring recesses, grooves and the like.

In operation of the improved micrometer height gage and indicator, the device is positioned with the base 2 against the member from which the height is to be determined and the set screws 14 and 15 are loosened and the arm 6 carrying the measuring arm therewith is then moved until the measurement of the article is roughly obtained and then the upper set screw 14 is tightened which locks the collar 10 to the standard and the adjusting nut 12 is then rotated until the finer adjustment is obtained and then the lower set screw 15 is tightened and the arm 26 is locked to the standard. This gives the measurement of the article to one-half, one-quarter or one-eighth inches and to obtain the finer adjustment the adjusting nut 23 is turned to slowly move the scriber point until the same is at the desired position, which will allow the plunger to move up or down according to the movement of the scriber and the dial will give the fraction of the distance in fractions of an inch, which can be added or subtracted from the rough measurement indicated by the pointer 9 carried by the member 7. The scriber can be slid over the surface of the article being measured and any variations in the height thereof can be readily determined by rotating the nut 23 which will indicate the variations on the dial.

The scale 5 begins at a point above the base 2 so as to account for the arm 21 being offset from the pointer 9 from which the measurement is taken.

In practice, I have found that the form of my invention, illustrated in the accompanying drawing and referred to in the above description, as the preferred embodiment, is the most efficient and practical; yet realizing the conditions concurrent with the adoption of my device will necessarily vary, I desire to emphasize the fact that various minor changes in details of construction, proportion and arrangement of parts may be resorted to, when required without sacrificing any of the advantages of my invention as set forth.

When the device is to be used for determining variations in the height of the article being measured, the scriber 27 is removed from the arm and the plunger 18 of the indicator dial is placed directly on the upper surface of the article being measured, and the same can be slid over the surface of the article and the variations in the height thereof will be readily seen.

What I claim as new is:—

1. A height gage including a graduated standard, a member adjustable on the standard, means for securing the member in adjusted position on said standard, a gage carried by the member, a scriber adapted for coöperation with the gage, and means adjustably securing the scriber to the member.

2. A height gage including a graduated standard, an arm adjustable on the standard, an index pointer carried by the arm and coöperating with the graduations on the standard, a measuring arm adjustable with relation to the first arm, a flat reversible scriber having plane upper and lower surfaces carried by the measuring arm, and a dial gage carried by the first arm for coöperation with and operated by the scriber.

3. A height gage including a base, a graduated standard, an arm having one end slidably mounted on the standard, a dial indicator carried by the other end of the arm, an index pointer carried by the arm and coöperating with the graduations on the standard, a vertical rib formed on the arm, a measuring arm slidably mounted on the rib and projecting in the same direction as the first mentioned arm, means to adjust the measuring arm on the rib, and a scriber carried by the free end of the measuring arm and engaging the dial indicator, as and for the purpose specified.

4. A height gage including a graduated standard, an arm adjustable on the standard, an index pointer carried by the arm and coöperating with the graduations on the standard, a measuring arm adjustable with relation to the first arm, a dial indicator carried by the first arm, and a scriber carried by the measuring arm for coöperation with the gage, the lower surface of the scriber at the outer end thereof being beveled upwardly, and means to detachably hold the scriber in position, whereby the same can be turned over so as to bring the beveled surface of the same on the upper edge thereof, as and for the purpose specified.

In testimony whereof I affix my signature in presence of two witnesses.

WALTER B. POWELL.

Witnesses:
 BENNETT S. JONES,
 GEORGE W. WRIGHT.